(12) United States Patent
Kuhlmann (10) Patent No.: US 10,562,042 B2
(45) Date of Patent: Feb. 18, 2020

(54) SEPARATOR FOR SEPARATING SOLID MATTER FROM A FLUID

(71) Applicant: HYDROCON GMBH, Rosendahl (DE)

(72) Inventor: Lothar Kuhlmann, Rosendahl (DE)

(73) Assignee: HydroCon GmbH, Munich (DE)

( * ) Notice: Subject to any disclaimer, the term of this patent is extended or adjusted under 35 U.S.C. 154(b) by 12 days.

(21) Appl. No.: 16/072,810

(22) PCT Filed: Jan. 25, 2016

(86) PCT No.: PCT/IB2016/000044
§ 371 (c)(1),
(2) Date: Jul. 25, 2018

(87) PCT Pub. No.: WO2017/130012
PCT Pub. Date: Aug. 31, 2007

(65) Prior Publication Data
US 2019/0030547 A1    Jan. 31, 2019

(51) Int. Cl.
*B04C 5/13* (2006.01)
*B04C 5/185* (2006.01)
(Continued)

(52) U.S. Cl.
CPC .............. *B04C 5/13* (2013.01); *B01D 21/267* (2013.01); *B04C 5/04* (2013.01); *B04C 5/185* (2013.01);
(Continued)

(58) Field of Classification Search
None
See application file for complete search history.

(56) References Cited

U.S. PATENT DOCUMENTS 2,605,971 A    8/1952  Andrews
3,616,617 A *  11/1971 De Groote ............. B01D 45/14
                                                      55/307
(Continued)

FOREIGN PATENT DOCUMENTS

GB     2338192 A     12/1999
SU     1542588 A1    2/1990
WO     2013045637 A1 4/2013

OTHER PUBLICATIONS

The International Bureau of WIPO, International Preliminary Report on Patentability for PCT/IB2016/000044, dated Aug. 9, 2018.
(Continued)

*Primary Examiner* — Chester T Barry
(74) *Attorney, Agent, or Firm* — Ice Miller LLC (57) ABSTRACT

A separator comprises a separator housing section forming an at least partially cylindrical inner wall with respect to a vertical axis, a funnel-shaped upper member with a large diameter portion being attached to said inner wall, a funnel-shaped lower member with a large diameter portion being attached to said inner wall at a position lower than said large diameter portion of said funnel-shaped upper member, an inlet opening arranged for leading fluid into said separator housing section at a position between said large diameter portions of the upper and funnel-shaped members with a flow direction of said fluid having at least a tangential component at said inlet opening. Said upper and lower funnel-shaped members each have axial openings at respective lower end portions opposite to said large diameter portions.

15 Claims, 8 Drawing Sheets

(51) Int. Cl.
   *B01D 21/26* (2006.01)
   *B04C 5/04* (2006.01)
   *B04C 9/00* (2006.01)

(52) U.S. Cl.
   CPC .. *B01D 2275/203* (2013.01); *B04C 2009/002* (2013.01); *B04C 2009/004* (2013.01)

(56) References Cited

U.S. PATENT DOCUMENTS

| | | | | |
|---|---|---|---|---|
| 4,168,150 | A | * | 9/1979 | Pircon ................ C05B 11/08 423/243.06 |
| 4,268,288 | A | | 5/1981 | Coombs |
| 4,895,582 | A | | 1/1990 | Bielefeldt |
| 5,707,410 | A | * | 1/1998 | Puls .................. B01D 47/06 261/98 |
| 7,998,251 | B2 | * | 8/2011 | Pondelick ............ B01D 45/16 4/DIG. 19 |
| 2007/0256564 | A1 | | 11/2007 | Moore |

OTHER PUBLICATIONS

European Patent Office, International Search Report for PCT/IB2016/000044, dated Jun. 30, 2016.
European Patent Office, Written Opinion of the International Searching Authority for PCT/IB2016/000044, dated Jun. 30, 2016.

\* cited by examiner

Section: A-A

○ Large Particles
× Medium Particles
  Fine Particles
✖ Light Matter/Fluid

FIG. 8

SEPARATOR FOR SEPARATING SOLID MATTER FROM A FLUID

CROSS-REFERENCE TO RELATED APPLICATIONS

The present application is related to and claims the priority benefit of International Patent Application Serial No. PCT/IB2016/000044, filed Jan. 25, 2016, the text and drawings of which are hereby incorporated by reference in their entireties.

The present invention relates to a separator for separating solid matter from a fluid. In particular, the invention relates to a separator having an improved structure which enables a treatment of fluid at flow rates in wide ranges.

TECHNICAL BACKGROUND

Separators for separating solid matter from a fluid are known from the prior art. In particular, separators having a cyclone structure are known which employ the specific function of a rotating flow of fluid in order to separate solid matter based on inertia forces due to differences in density. According to the known separators using a cyclone structure, a problem arises in cases where the flow rate of treated fluid varies in wide ranges. In particular, in cases where the fluid to be treated enters the cyclone structure as flush, the function for separating solid matter from the fluid cannot be secured.

SUMMARY OF THE INVENTION

It is the object of the present invention to provide an improved separator for separating solid matter from a fluid which enables a sufficient separating action even in an operational situation where the fluid enters the separator in a flush manner.

The object is solved by a separator for separating solid matter from a fluid according to claim 1. Further developments of the invention are defined in the dependent claims.

According to the basic concept of the invention, the separator comprises the following:

A separator housing section forming an at least partially cylindrical inner wall with respect to a vertical axis,
a funnel-shaped upper member with a large diameter portion being attached to said inner wall,
a funnel-shaped lower member with a large diameter portion being attached to said inner wall at a position lower than said large diameter portion of said funnel-shaped upper member,
an inlet opening arranged for leading fluid into said separator housing section at a position between said large diameter portions of the upper and funnel-shaped members with a flow direction of said fluid having at least a tangential component at said inlet opening,
wherein said upper and lower funnel-shaped members each have axial openings at respective lower end portions opposite to said large diameter portions.

According to the inventive concept defined above, the separator comprises said funnel-shaped upper member and said funnel-shaped lower member which are arranged in order to create an annular flow passage in between which provides the required rotational movement which is generic for a cyclone concept. According to this concept, the inlet opening is arranged such that a rotational movement is exerted to the fluid which is rotationally moved through the annular passage between the upper and lower funnel-shaped members. In the course of passing the annular passage downwards, the rotational speed of the fluid increases. Based on this increase of rotational speed, the function for separating solid matter from the fluid passing through the annular passage is enhanced in the course of the flow through said annular passage.

According to an embodiment, the annular passage is defined by a radial outer surface of said upper funnel-shaped member and a radial inner surface of said lower funnel-shaped member. In this concept, the rotating fluid is guided by the upper and lower funnel-shaped members.

According to an embodiment, a diameter of each of said funnel-shaped members continuously decreases from the respective large diameter portion towards a respective lower end portion thereof.

According to an embodiment, said upper funnel-shaped member protrudes into said lower funnel-shaped member, wherein preferably said axial opening of said lower funnel-shaped member is positioned lower than said axial opening of said upper funnel-shaped member. According to this arrangement, the annular passage is created by arranging the upper funnel-shaped member in relation to the lower funnel-shaped member such that surfaces thereof face each other and therefore form the annular passage.

According to an embodiment, a cross-sectional area or an average diameter of said annular passage decreases from said large diameter portion of said lower funnel-shaped member towards said lower end portion of said upper funnel-shaped member. According to this embodiment, the diameter or radius of rotation of the fluid rotationally passing through the annular passage is decreased which, in turn, increases the radial acceleration exerted to solid matter in said fluid. Based on this arrangement, the separating function is further increased.

According to an embodiment, the axial opening of said lower funnel-shaped member opens to an accommodation space for accommodating solid matter separated from said fluid. Solid matter which is forced to the radial outer side of the rotating fluid is disposable in said accommodation space. The accommodation space can be accessible in order to remove matter accommodated in the accommodation space. The action for removing the disposed matter can be continuous or non-continuous. A specific opening can be provided in said arrangement for accessing said accommodation space.

According to an embodiment, the upper funnel-shaped member opens with its large diameter portion to an outlet section. In a further embodiment, the outlet section is formed with an inner wall which is continuous with an inner surface of said upper funnel-shaped member. Moreover, in a further embodiment, said outlet section is formed with a circular cross-section with a maximum diameter being larger than a diameter of said large diameter portion of said upper funnel-shaped member. With such an arrangement, the flow of fluid is settled and turbulences are reduced.

According to an embodiment, a passage is formed for allowing a flow of said fluid from said inlet opening through said annular passage, into said axial opening of said upper funnel-shaped member and said large diameter portion of said upper funnel-shaped member in this sequence. According to this embodiment, the fluid which passes through the annular passage is forced into the axial opening of the upper funnel-shaped member. In this way, the flow of the fluid is deflected from a rotationally downward direction to an upward direction. This action further increases the efficiency for separating solid matter from said fluid due to an additional acceleration exerted to the solid matter in said fluid.

In particular, the function to deposit the solid matter in the accommodation space is largely enhanced as explained below.

Due to the inertia forces acting on the particles to be separated, the deflection effects that the particles are driven towards the inner surface of the lower funnel-shaped member and are moved downwards due to the flow of fluid which is directed downwards in this area. As result, the particles are moved to the accommodation space.

Very small particles are transported by the flow of fluid to which the deflection is exerted though the opening of the upper funnel-shaped member to the inside thereof.

In the lower area of the system, energy loss is caused by the deflection of the flow of fluid and this leads to a reduction of the rotation of the fluid. Moreover, the average velocity of the flow of fluid in the lower opening of the upper funnel-shaped member is substantially lower than the velocity of flow in the inlet opening. In particular the average velocity of the flow in the lower opening of the upper funnel-shaped member is in a range of 15-35%, preferably in a range of 20-30% or approximately at a value of 25% of the average velocity of the flow in the inlet opening.

The velocity is decelerated due to the increase in diameter of the upper funnel-shaped member and the geometry of the housing section above the upper funnel-shaped member, preferably the average velocity of the flow in the area of a maximum inner diameter in a transition between said separator housing section and said outlet housing section is $1/100$ to $1/200$ of the average velocity of the flow in the inlet opening as outlined in detail below. This deceleration leads to static situations in which the particles do not move or move to a very low extent. In this situation, a coagulation of small particles increases the diameter or size particle groups or aggregates which changes the flow properties thereof such that these coagulated particles move downwards against the flow direction due to gravity.

According to an embodiment, the arrangement of said inlet opening is such that a swirl is exerted to said flow of fluid whereby a vortex flow is achievable at least in said annular passage. As stated above, the vortex flow is provided for exerting an acceleration to the solid matter which concentrates in the radial outer area of said annular passage.

According to an embodiment, a vortex centering means is provided in the form of an upwardly directed installation in the area of said axial opening of said lower funnel-shaped element. In order to provide a defined flow condition, the vortex centering means is provided which can be formed as cone-shaped installation in one example. Based on this structure, the center of rotation of the vortex flow is properly defined such that the separating efficiency is further increased. The vortex centering means can be provided as plate member or cylindrical member instead.

According to an embodiment, a fluid communication line is provided for establishing a communication to an area inside said separator housing section between said upper and lower funnel-shaped members. With this fluid communication line, liquid matter or light material which concentrates on the surface level of the fluid in this area can be removed by a suction arrangement such as a pump or the like connectable to said fluid communication line.

According to an embodiment, the separator further comprises a separating shield in a space between said upper and lower funnel-shaped members, wherein said separating shield is preferably formed as annular member which is attached to said inner wall of said separator housing section and preferably radially spaced to said outer surface of said upper funnel-shaped member. This separating shield enables a concentration of liquid or light material which in operation of the separator concentrates on the surface level of the fluid in this area. In particular, it is possible that the liquid or light material settles on the upper surface of the separating shield. By using the fluid communication line, the liquid or light material can be removed from this area.

According to an embodiment, the separating shield is formed by permeable material and is preferably bulged upwards. Accordingly, the light material can be collected on the upper surface and using a permeable material, the fluid can be separated from this light material.

According to an embodiment, a treatment section is fluidly connected downstream of said upper funnel-shaped member which is preferably provided with means for treating fluid flowing through said treatment section. The treatment section is arranged in a location of the separator at which the solid matter has been removed from the fluid based on the cyclone effect of the separator to a high extent. Consequently, the treatment section can be operated with high efficiency due to the fact that the main part of the solid matter has been removed and will not affect the efficiency of the treatment section.

According to an embodiment, the treatment section comprises at least one of a filter and a reacting material. A filter can be used for separating remaining solid matter from the fluid which has not been removed based on the cyclone effect. Moreover, a reacting material can be employed which preferably chemically reacts with e.g. soluble material in said fluid.

According to an embodiment, an overflow section is provided downstream of said treatment section for leading fluid towards an outlet of said separator. The overflow section provides a defined outflow of the fluid in order to secure the function of the treatment section. According to an embodiment, the overflow section is adjustable for levelling edges of said overflow section with respect to a horizontal orientation by a levelling arrangement. As the separator cannot be mounted in some cases such that the axis of symmetry is perfectly aligned to the horizontal direction, the overflow section can be adjusted by the above-defined levelling arrangement in order to achieve at least a sufficient levelling of the overflow section. Such a levelling affects an optimum distribution of the flow at all areas of the overflow section.

According to an embodiment, each of said upper and lower funnel-shaped members is made by concrete based elements. Concrete based elements are easy to produce and can be adapted to the required shape. Moreover, such elements provide a long lifetime and do not require maintenance. However, it possible to use different materials such as sheet metal or fiber reinforced carbon or resin.

According to an embodiment, an axial position of said upper funnel-shaped member and/or of said lower funnel-shaped member inside said separator housing section in the direction of the vertical axis is adjustable. According to such an arrangement, the dimensions, shape or characteristic in general of the annular passage between the upper and lower funnel-shaped members can be adjusted to the specific requirements. This adjustment can be provided in mounting said separator or the adjustment can be provided as controllable adjustment throughout the operation. It is even possible to provide a control system for controlling the axial position of said upper funnel-shaped member and/or of said lower funnel-shaped member based on control variables such as the flow rate of entering fluid.

According to an embodiment, said treatment section is provided in an outlet housing section having a larger inner diameter than the separator housing section. An increased inner diameter of a space for passing a flow of fluid decreases the average velocity of the fluid. In the treatment section, a low fluid velocity is required in order to optimize the efficiency of the treatment of the fluid. Consequently, this arrangement further increases the overall efficiency of the separator.

According to an embodiment, in a transition between said separator housing section and said outlet housing section, an adapter element is provided which has an inner surface which is continuous with said inner surface of said upper funnel-shaped member and an inner surface portion of said outlet housing section. The continuous arrangement of the surfaces provides a flow with decreased turbulence and enables a settlement of the flow of the fluid which increases the efficiency of the treatment section and the separator in general.

According to an embodiment, said inlet opening is connected to an inlet duct, wherein at least a part of said inlet duct is equipped with an inner diameter which continuously decreases towards said inlet opening. The decrease of the inner diameter of the inlet duct increases the average velocity of the fluid passing through the inlet duct such that the vortex in the annular passage is further increased. Such an increase of the vortex, in turn, enhances the separating efficiency of the cyclone arrangement of the separator.

According to the present invention, the separator can be applied to the treatment of surface water which includes liquid and solid matter and which are to be removed before the surface water is passed to a sewage drain. It is the specific advantage of the present invention that the above-defined separator can handle flush like flows of surface water and provides, at the same time, a high efficiency through a wide range of flow rates to be treated.

According to an embodiment, a filter element is provided in an area of said separator having the largest inner diameter and/or in an area providing the lowest average flow velocity in the separator. The filter element is provided in the area of the separator with lowest flow velocity in order to enhance the filter efficiency and enable a fine file material to be used due to the large surface area which is available for arranging the filter. Such a filter enhances the total efficiency of the separator by inhibiting solid matter from entering the treatment section as much as possible. In particular, the particles are maintained below the filter and can form coagulated particles due to adhesion in the course of the operation of the separator. Such coagulated particles are different in flow properties and likely to fall down even against the upward flow in the area of the filter element. Therefore, the efficiency of the filter element is improved as an inherent or automatic mechanism moves the particles towards the bottom. The separator can be operated in an intermittent manner and, thus, clouds of particles which continuously coagulate can be formed and move downwards due to the increasing amount of substance collected in aggregates. The filter element can be provided with a rim carrying the filter material in between. The rim can be provided as inflatable tube which can be set in a recess formed in an inner wall of the outlet housing section. The tube can be connected by a line which is accessible from the outside in order to inflate or collapse the tube for mounting or unmounting the filter element. The filter element can be removed from the separator through an opening at a predetermined position, e.g. in the treatment section as example.

According to an embodiment, when a cross sectional area of a flow of fluid entering said separator housing section is defined as A and a maximum cross sectional area inside said separator housing section is defined as B, the relationship of B/A equals a value of 100 or more. Based on such a relationship, the vortex created in the separator is properly producible, while at the same time, the flow of fluid is settled in the location with the maximum cross sectional area to a high extent. A preferable relationship of B/A results in a range of 100 to 125. Values of less than 100, e.g. 50 are possible and the effect of the invention is still achievable, but better results are achieved at values of at least 100.

According to an embodiment, a damping volume is formed in operation of said separator defined by a section of the inner wall of said separator housing section, a fluid level surface and the radial outer surface of said funnel-shaped upper member and/or the radial outer surface of said funnel-shaped lower member, for establishing a damping function by an interaction of air in said damping volume with said fluid. Due to the construction of the separator having an upwardly closed space below the top ends of the funnel-shaped members, air is caught in this space which has a damping effect sue to the compressible characteristic. Thus, the non-stationary flush of fluid into said separator is damped and the flow through the separator is made smoother.

According to an embodiment, said funnel-shaped upper member is provided with a particle repellent characteristic at least partially at a radial inner surface and/or with a particle coalescing characteristic at least partially at a radial outer surface. As example, the surface can be silicified or a surface treatment using nanoparticles can be applied.

The invention is not limited to the treatment of surface water and can be employed to any type of fluid which is contaminated with solid matter or liquid matter to be removed from the fluid. In addition, the invention is not restricted to a stationary system and rather can be applied to a mobile system for treating water or other fluids. In addition, the separation of solid matter is one of the results of the function of the separator, while also light materials as well as fluids such as oil having a lower density compared to the treated fluid can be removed. Moreover, the design of the funnel-shaped elements is not restricted to the shape shown in the drawings. While a contour of the surfaces deviating from a linear cone is shown as preferable example, it is possible to select the design of the funnel-shaped elements as desired as long as the inventive solution is achieved.

BRIEF DESCRIPTION OF THE DRAWINGS

An embodiment of the invention is shown in the drawings. It is noted that the drawings show various views of the separator with slight modifications.

FIGS. 2-6 illustrate modifications of the embodiment of FIG. 1, and FIGS. 7 and 8 show the principle of flow in the separator in a schematic illustration.

DESCRIPTION OF THE EMBODIMENTS

In the following, embodiments of the present invention are explained based on the drawings.

The Figures illustrate the separator according to an embodiment in a sectional view with various modifications being shown. In particular, in the illustration of FIG. 1, the separator is shown in a longitudinal section disclosing a part of the inner structure of the arrangement. In the drawings, some Figures show the separator with more elements while others show the separator with more or modified elements. In any case, the basic concept of the invention is defined by the claims setting out the scope of the invention.

The separator comprises a housing section 1 at the lower end thereof. The housing section 1 is formed with an inner wall 2 which is in the present embodiment as at least partially cylindrical inner wall with respect to a vertical axis V. The separator housing section 1 is formed in a cup shape with a bottom and an open upper end. The bottom forms an accommodation space 7 and can be provided with inclined or cone-shaped walls in order to concentrate matter in a center area thereof.

A funnel-shaped upper member 3 is mounted to the inner wall 2 of the separator housing 1. The mounting location of the funnel-shaped upper member 3 is in the present embodiment the upper area of the separator housing section 1. A funnel-shaped lower member 4 is mounted in the separator housing section 1 below the funnel-shaped upper member 3. Each of the upper and lower funnel-shaped members 3, 4 has a large diameter portion 30, 40 which are mounted to the separator housing section 1 at the inner wall 2. Preferably, the large diameter portions 30, 40 are formed such that an axial movement of the funnel-shaped upper and lower members 3, 4 is possible.

As illustrated in FIGS. 3-6, an inlet opening is arranged in the separator housing section 1, in particular, in the inner wall 2 such that the inlet opening 5 opens to an annular passage 6 formed between the upper and lower funnel-shaped members 3, 4. The inlet opening 5 is connected to an inlet duct 14 and the direction of flow is substantially tangential with respect to the rotational axis of the separator housing section 1. A cross sectional area of the inlet opening, measured perpendicular to the flow direction of the fluid, is defined as A and will be discussed below. Moreover, the duct 14 is provided with a decreasing inner diameter in order to increase the average velocity of the fluid passing through the inlet duct 14.

On top of the separator housing section 1, an outlet housing section 60 is provided which carries a top housing 62. In the present embodiment, an adapter element 61 is arranged axially between the outlet housing section 60 and the separator housing section 1 in order to adapt the differences in diameters of the outlet housing section 60 and the separator housing section 1. Moreover, an insert 63 is provided in the outlet housing section which forms a continuous surface together 80 with a section of the outlet housing section 60 and a section of the adapter element 61.

It is noted that the housing elements such as the inlet housing section 1, the outlet housing section 60, the adapter element 61, the top housing 62 and/or the insert 63 can be manufactured by a concrete based material or as alternative by resin reinforced carbon or resin. The material for forming these elements is not essential for the invention. It is also possible to use polymer concrete, thermosetting material or thermoplast. In order to enhance the integrity of the elements, reinforcement material, such as steel, carbon, resin or glass can be used for manufacturing the members. However, concrete based elements are preferred in view of the advantageous effect for the precipitation of heavy metals from the fluid.

The adapter element 61 can be provided with annular recesses or mating surfaces in order to enable a mounting of the adapter element 61 to the top end of the separator housing section 1 and to the bottom end of the outlet housing section 60. Moreover, an inner surface of the adapter element 61 can be shaped as continuous surface with respect to a radial inner surface 33 of the funnel-shaped upper element 3.

An outlet section 8 is formed above the funnel-shaped upper member 3 in the area where the separator housing section 1 and the outlet housing section 60 are mounted to each other. The outlet section 8 is defined by inner sections of the adapter element 61, the outlet housing section 60 and the insert 63.

A treatment section 50 is provided above the outlet section 8 inside the outlet housing section 60. The treatment section 50 is explained below in detail with various modifications.

The basic concept of the present invention relates to the specific arrangement of the funnel-shaped upper and lower members 3, 4 in the separator housing section 1. In the following, the specific function and operation of this arrangement and its cyclone effect is explained.

Upon entering a fluid, such as water, which is contaminated with foreign matter, such as solid matter with a specific particle distribution, a vortex of flow is created between a radial outer surface 32 of said upper funnel-shaped member 3 and a radial inner surface 43 of said lower funnel-shaped member 4. In particular, the annular passage 6 is passed by the fluid and rotates about the vertical axis V and moves at the same time downwardly. Due to the fact that the average diameter and the surface area of the annular passage 6 decreases upon the downward movement of the fluid, the rotational speed of the created vortex increases in this direction.

The rotation of the fluid affects an acceleration force to the solid matter in the fluid. In case that the density of the solid matter is higher than the density of the fluid, the solid matter is driven in the radial outward direction.

As can be derived from FIGS. 1-6, the axial opening 31 of the funnel-shaped upper member 3 is located above the axial opening 41 of the funnel-shaped lower member 4. As the fluid is forced into the axial opening 31 of the funnel-shaped upper member 3, the direction of flow is turned from downwards to upwards at the area between the axial openings 31, 41. In combination with the acceleration based on the rotation exerted to the solid matter, the change of direction of the flow affects a separation of the solid matter from the fluid in this area such that the solid matter will not be moved into the axial opening 31 of the funnel-shaped upper member 3 but rather will be deposited in the accommodation space 7 through the axial opening 41 of the funnel-shaped lower member 4.

Figure 7:
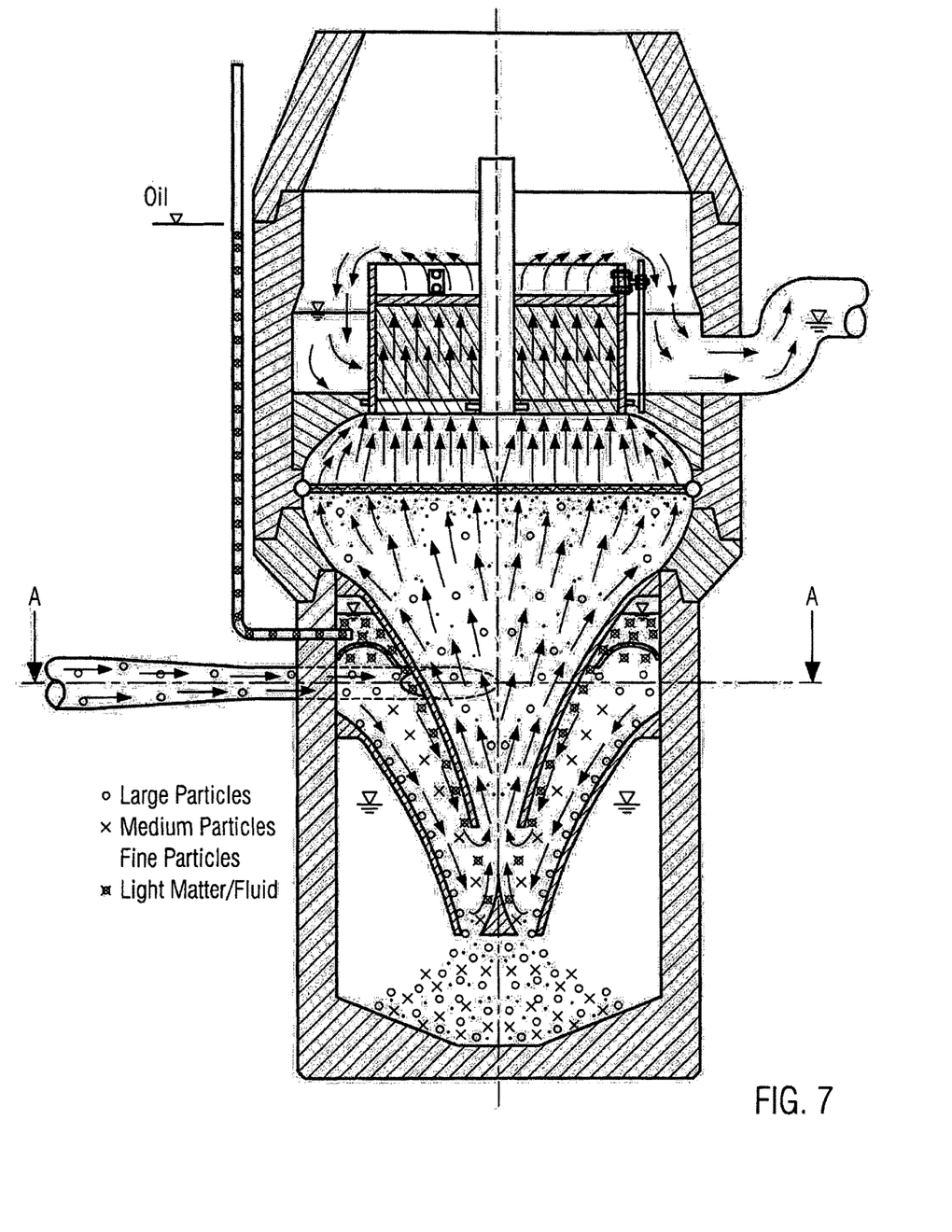
Figure 8:
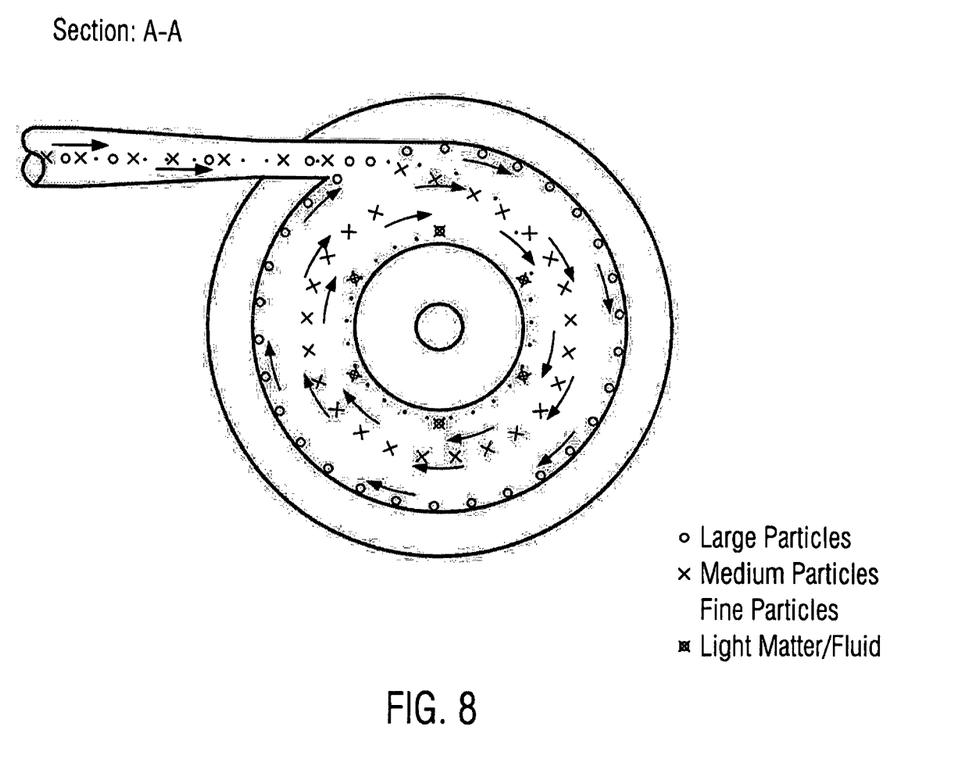

As consequence, the separator according to the present invention provides an improved separating efficiency compared to systems comprising a single funnel-shaped member as used in cyclones according to the prior art. FIG. 7 shows the flow directions in a schematic view. This illustration discloses the distribution of large, medium and fine particles as indicated in the drawing. FIG. 8 is a cross sectional view of FIG. 7.

As shown in FIGS. 3-6, a vortex centering means 9 is provided in the area between the axial openings 31, 41 of the funnel-shaped members 3, 4. This vortex centering means can be provided as cone-shaped element in order to provide a defined rotational axis of the vortex of the fluid when operating the separator. Accordingly, the separating efficiency of the separator can be further improved as the flow conditions in this area are properly defined such that the center of the vortex does not change in location whereby a movement of solid matter into the axial opening 31 of the funnel-shaped upper member 3 is avoided as much as possible.

Upon entering the axial opening 31 of the funnel-shaped upper member 3, the fluid flows upwardly along the inner space formed by the inner surface 33 of the funnel-shaped upper member 3. As the passage area inside the funnel-shaped upper member 3 increases in an upward direction, the average velocity of the fluid is decreased.

A further advantage of the arrangement according to the present invention is the formation of an air filled space above a fluid level between the radial outer surface 32 of the funnel-shaped upper member 3 and the inner wall 2 of the separator housing section 1 and/or between the radial outer surface 42 of the funnel-shaped lower member 4 and the inner wall 2 of the separator housing section 1. Theses spaces form damping spaces D, D' as shown in the drawings upon entering water into the separator. The inventors have revealed that in particular in flush-like operation conditions, this air filled space D provides a damping effect in order to avoid a situation in which the fluid breaks through the separator as is the case in cyclone arrangements according to the prior art. A similar effect can be achieved at the area below the funnel-shaped lower member 4, i.e. above a formation of a fluid level where an air filled space as damping space D' is formed between the outer surface 42 of the funnel-shaped lower member 4 and the inner wall 2 of the separator housing section 1.

Figure 1:
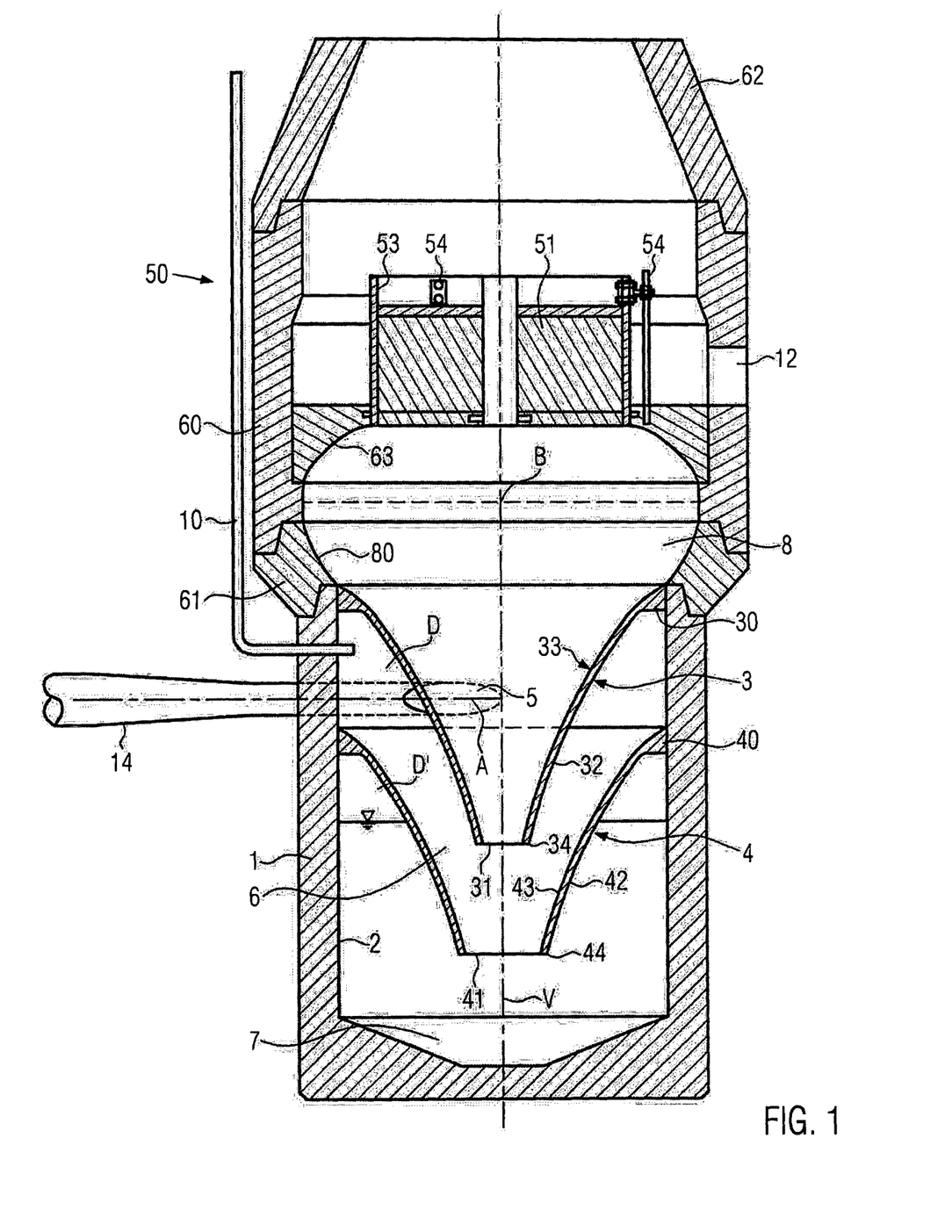
FIG. 1 illustrates the separator according to an embodiment in a sectional view.

The arrangement according to FIGS. 3-6 further includes a separating shield 11 in the area where a fluid level can be formed between the funnel-shaped upper and lower members 3, 4. This shield can be formed as circular, preferably bulged member for collecting light material such as resin pieces having a density lower than the fluid. The separating shield 11 is attached to the inner surface of the separator housing section 1, whereas an annular gap is provided at the inner periphery of the separating shield 11 and the out surface 32 of the upper funnel-shaped member 3. Light matter and light fluid can be lead to the top side of the separating shield 11 through this annular gap and can be collected at the upper surface thereof. The bulged shape of the separating shield 11 provides an enhanced stability of the element and improves the function to collect light matter or the like on the top surface thereof. In an embodiment, the separating shielding can be provided as permeable material, e.g. as grid or net. Moreover, the arrangement according to FIG. 1 is provided with a fluid communication line 10 providing a fluid communication between the outer space and the space between the funnel-shaped upper and lower members 3, 4, preferably in the area where the air filled space above the fluid level can be formed. This fluid communication line 10 can be used to remove collected matter from this space which basically will consist of light material such as resin but also will comprise liquid matter such as oil which will settle on the fluid level in this area and must be removed from this area. In order to operate the fluid communication line, a pump for sucking the material from this area can be connected to the other end opposite to the opening inside the separator housing section 1.

Figure 4:
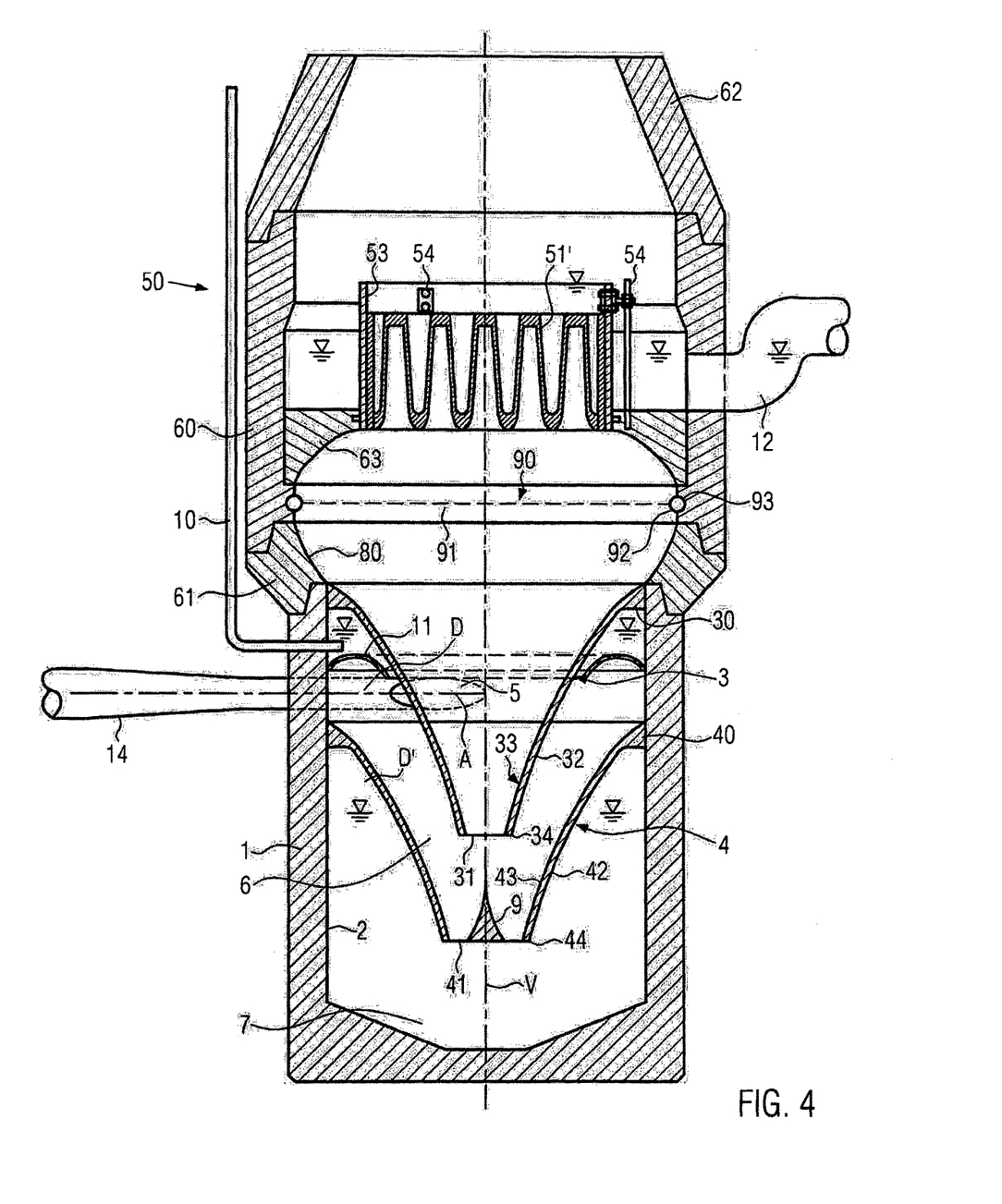
Figure 5:
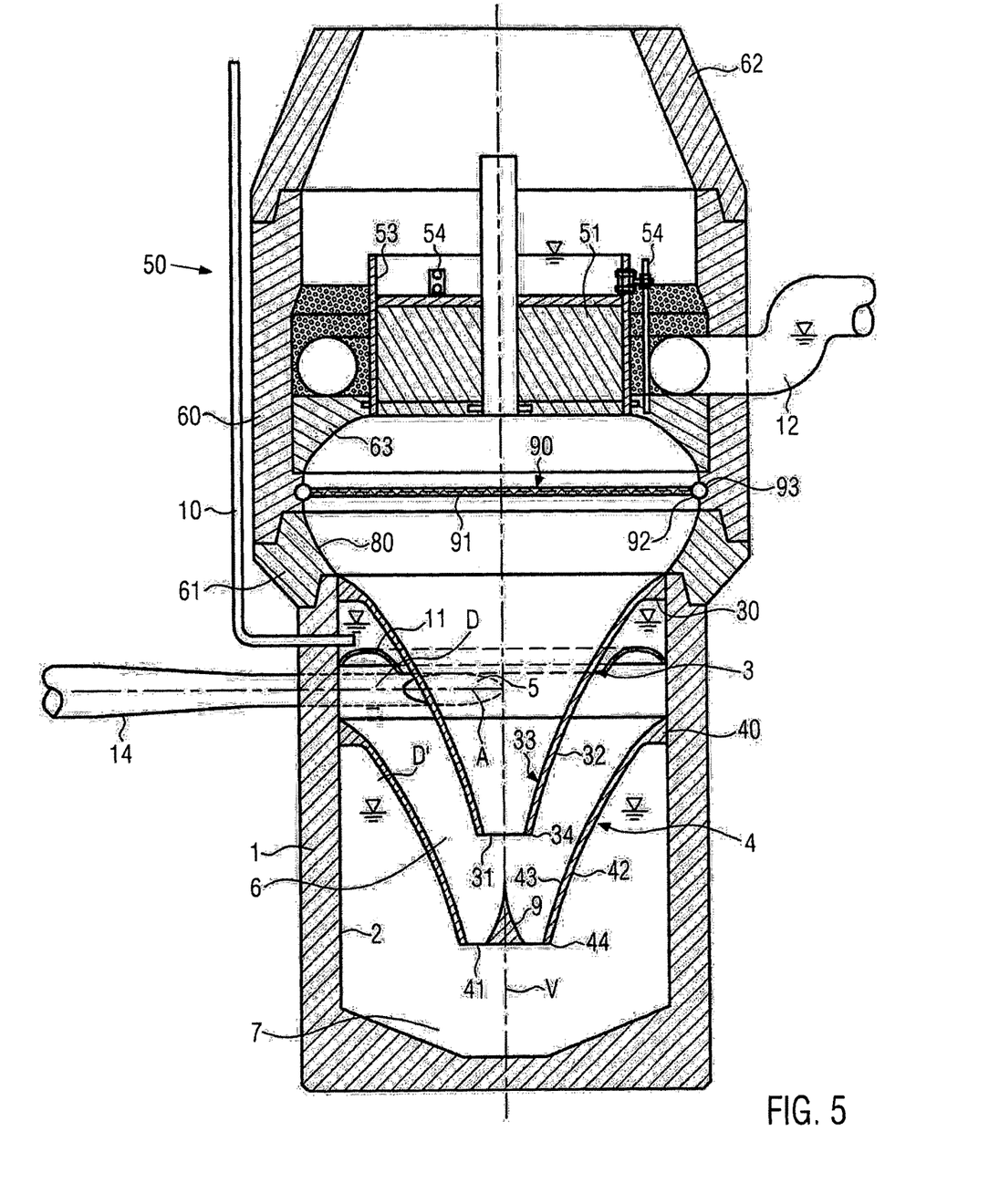

As stated above, the separator comprises a treatment section 50. This treatment section is provided on top of the outlet section 8 and arranged inside the outlet housing section 60. The treatment section can be provided with reactive material 52 as shown in FIG. 5 in order to remove soluble matter from the fluid before exiting the separator based on chemical reactions. Examples for such reactions are ion exchange, precipitation or any other chemical reaction which enables the desired effect. Moreover, filter arrangements as shown in the Figures can be provided in order to remove remaining solid matter from the fluid before leaving the separator. The filter can be a mesh filter 51 as shown in FIG. 1. As alternative, the filter can be formed as fabric filter 51' as shown in FIG. 4. This fabric filter 51' can be a fold element in order to increase the surface area thereof.

For this function, the separator is provided with an overflow section 53 which is provided in the present embodiment as cup-shaped element with radial outer walls. The fluid entering the cup-shaped overflow section is filled with the fluid in operation to the maximum level before the fluid overflows the radial outer wall of the overflow section. At the radial outside of the overflow section, reactive material 52 is provided through which the overflowing fluid flows and reacts accordingly. A duct is provided at the bottom area of the annular space between the outlet housing section 60 and the overflow section which is connected to an outlet 12 of the separator. The outlet 12 is led towards a drain or the like.

Figure 2:
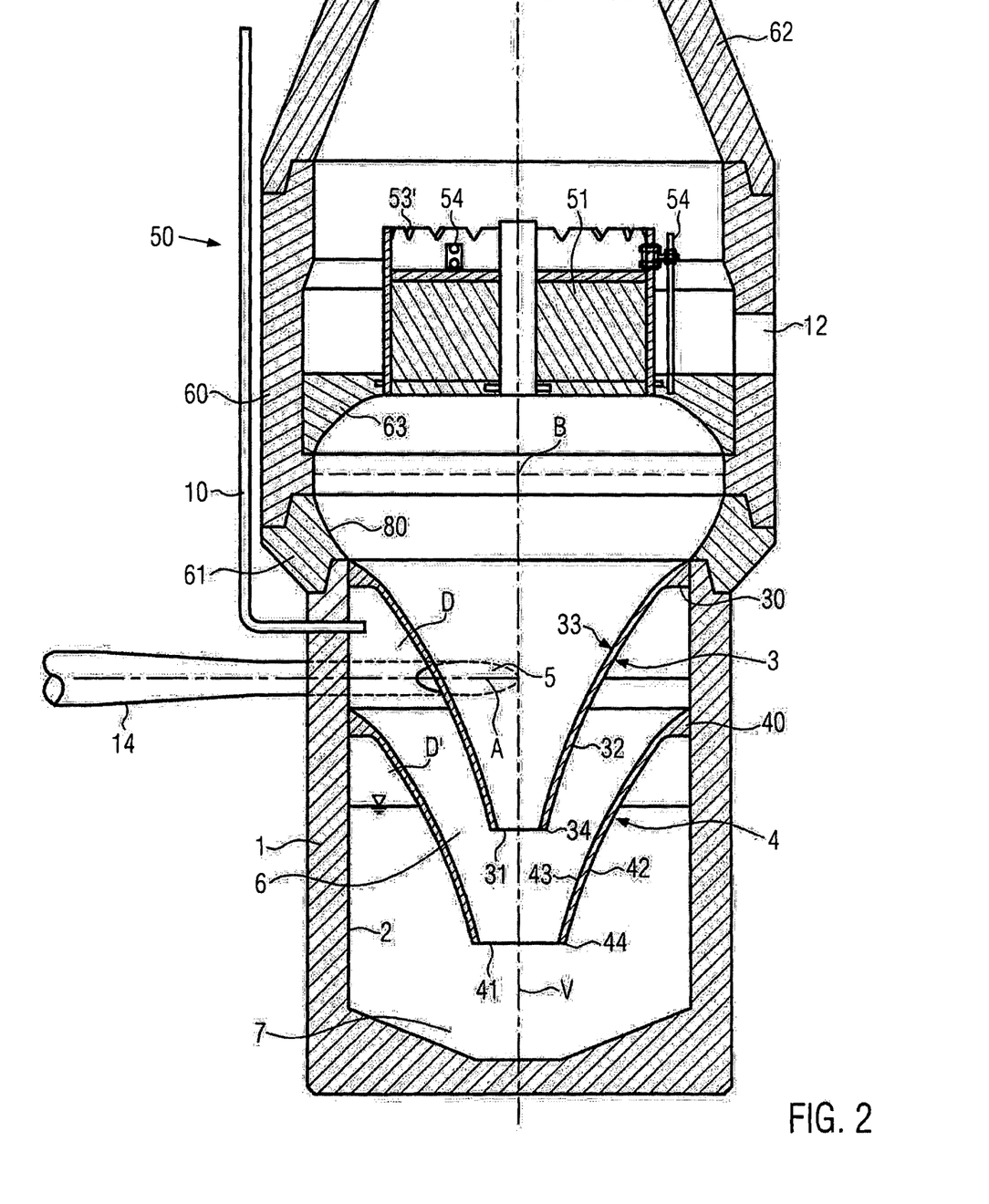
Figure 3:
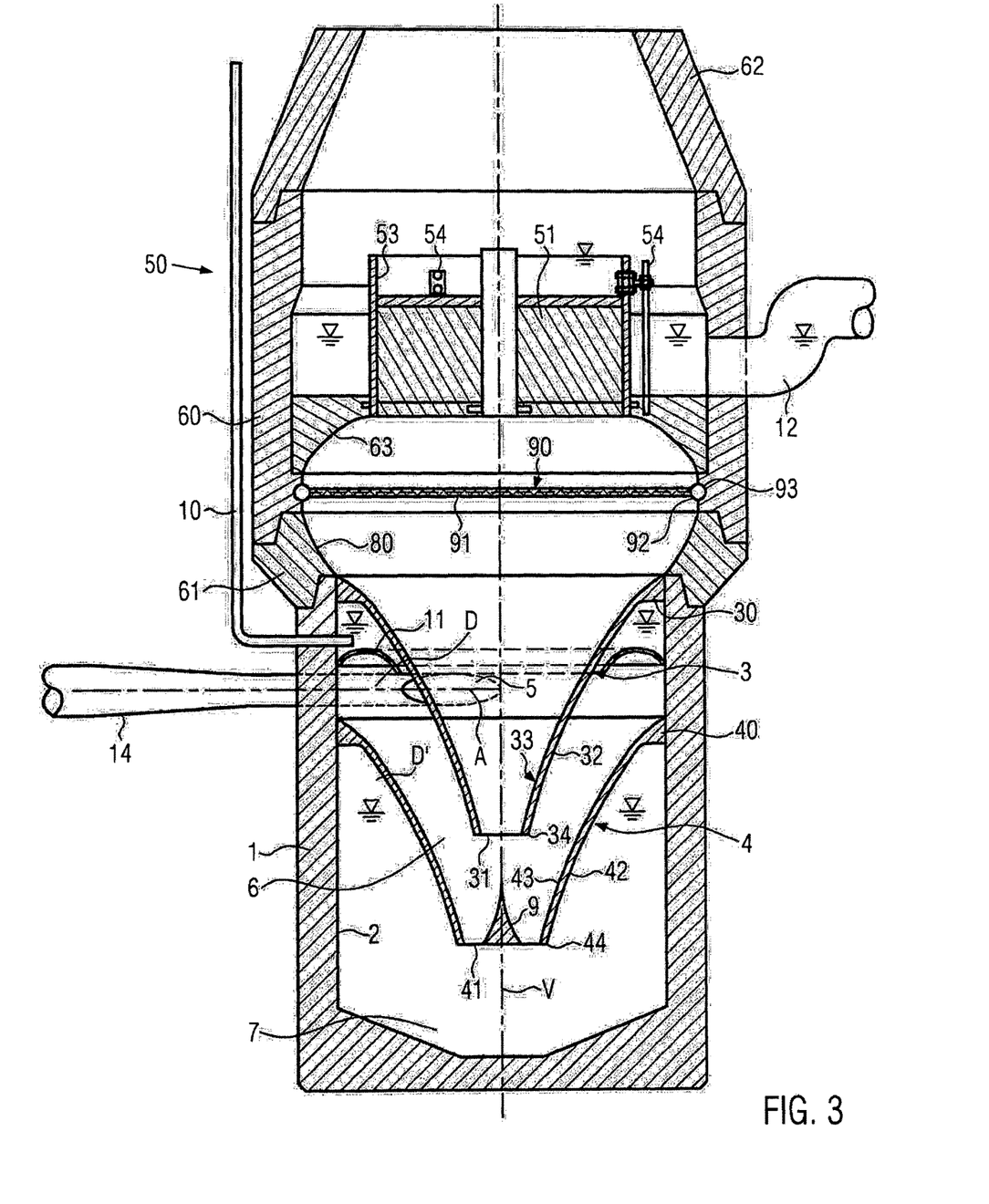
Figure 6:
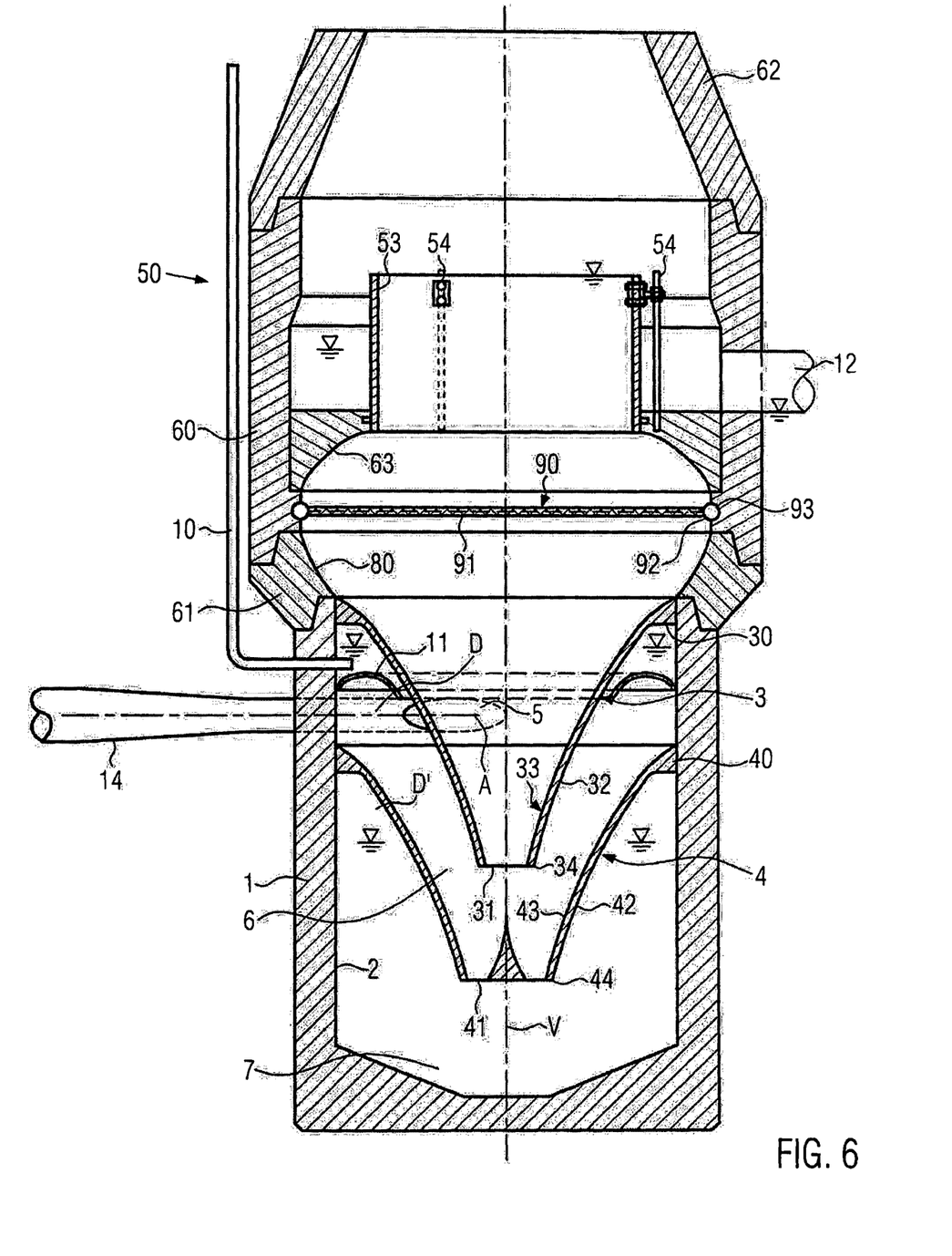

The overflow section 53, in particular, the radial outer wall thereof, has an upper edge over which overflowing fluid flows. The upper edge can include recesses 53' as shown in FIG. 2 in order to provide a defined flow characteristic. In order to provide a smooth flow from the overflow section 53 towards the reacting material 52, a levelling of the upper edge of the radial outer wall of the overflow section 53 is required. For this reason, an arrangement 54 for levelling the horizontal orientation of the overflow section 53 is provided. In the present case, the levelling arrangement 54 is provided with a threaded element which enables a change of level of said overflow section 53 by rotating the threaded element which is engaged with a stationary part of the separator on one side and with the overflow section 53. In order to provide an optimum levelling function, multiple threaded elements can be provided as shown in FIG. 6, such as three threaded elements which are distributed about the radial outer wall of the overflow section 53. With such an arrangement, a levelling can be achieved by adjusting the height of the upper edge of the overflow section 53 at three separate positions. The levelling arrangement can be achieved by different elements such as toothed elements, hydraulic or other means as long as the level of the overflow section 53 can be adjusted.

As can be derived from FIG. 1, a filter element 90 is provided in the outlet section 8, in particular, at an axial position of the separator where the inner diameter of the outlet section 8 is maximum. At this position, the average flow velocity of the fluid is minimum due to the maximum surface area in this location. The filter element 90 can be removable in order to replace or clean the filter element. In particular, the filter element 90 can be provided in a recess 93 in the inner wall of the outlet housing section 60. In this case, the filter element 90 can be provided with a not shown rim 92 which is flexible such that the rim 92 with filter material 91 provided radially inside the rim 92 can be folded and the filter element 90 is removable through an opening e.g. provided in the treatment section 50. The filter element 90 can be provided with a rim 92 in the form of an inflatable tube with a torus shape. Upon mounting the filter element 90 in the recess 93 in the outlet housing section 60, the inflatable tube is inflated by introducing air or gas with a predetermined pressure in order to secure the shape of the rim 92. In case that the filter element 90 is to be removed, the air or gas is depressurized such that the filter element 90 is foldable and therefore removable through the above mentioned opening. A specific line can be connected to the tube forming the rim 92 which is accessible from the outside. With such a construction, the filter element 90 can be removed for cleaning or replaced by a new filter element 90 without the requirement to open the separator. The filter element 90 can be applied to the separator explained above. As alternative, the filter element 90 is applicable to a general fluid element the function of which includes a flow of fluid which is directed upward, such a cyclone having only a single funnel-shaped member.

In order to optimize the flow conditions in the annular passage 6, it is possible to adjust the axial relative positions of the funnel-shaped upper and lower members 3, 4 inside the separator housing section 1. In particular, it is possible to preset the relative positions of the funnel-shaped upper and lower members 3, 4 in order to achieve optimum conditions with respect to the specific requirements of the case. Moreover, it is possible to provide an adjustable relationship of the axial positions of the funnel-shaped upper member 3 and/or the funnel-shaped lower member 4 inside the separator housing section 1 even throughout the operation of the separator. In particular, a control system can be provided which changes the axial position of the funnel-shaped upper member 3 and/or the funnel-shaped lower member 4 in view of operational conditions, such as the flow rate which is currently to be treated by the separator. Actuators can include electric drive means, hydraulic drive means or others. It is even possible to provide drive means for changing the axial positions of the funnel-shaped upper and lower members 3, 4 which are accessible from outside and manually operable.

As stated above, the cross sectional area of the inlet opening 5, measured perpendicular to the flow direction of the fluid, is defined as A. In this invention, the cross sectional area in the outlet section 8 with the maximum diameter is defined as B. In order to optimize the vortex generation in the separator and at the same time for ensuring an optimum removing efficiency, the relationship of B/A should be at least 100. With such a design, the flow velocity in the area of the filter element 90 is low enough to enable the use of a fine material. Moreover, the flow is settled in this area such that solid matter can deposit downwards. At the same time, a sufficient vortex is created by the higher velocity at the inlet opening 5 directed tangential with respect to the axis V. The value of B/A is preferably in range of 100 to 200, optimally in a range of 100 to 125.

The present invention is applicable as separator for separating solid matter from surface water before passing the surface water into a public drain. However, the separator can be applied for separating solid matter from any fluid as long as the separating effect based on the cyclone function can be achieved. Moreover, the dimensions of the separator are not limited to those which can be employed for treating surface water. Rather, any dimension or size of this separator is possible as long as the above-mentioned functions are achievable. In addition, it is possible to use the above-defined separator as mobile element in order to provide a treatment at locations where such a requirement is only needed from time to time.

In addition, a separator concept is possible in which two or more separators according to the above-discussed invention are connected and provide a similar or specifically adjusted characteristic.

The above-mentioned material for manufacturing the separator is not limited to concrete or concrete-based material. Rather, any material such as fibre reinforced resin or metal is useful as long as the above-mentioned function of the separator is achievable.

The invention claimed is:

1. Separator for separating solid matter from a fluid, comprising:
   a separator housing section (1) forming an at least partially cylindrical inner wall (2) with respect to a vertical axis (V),
   a funnel-shaped upper member (3) with a large diameter portion (30) being attached to said inner wall (2),
   a funnel-shaped lower member (4) with a large diameter portion (40) being attached to said inner wall (2) at a position lower than said large diameter portion (30) of said funnel-shaped upper member (3),
   an inlet opening (5) arranged for leading fluid into said separator housing section (1) at a position between said large diameter portions (30, 40) of the upper and lower funnel-shaped members (3, 4) with a flow direction of said fluid having at least a tangential component at said inlet opening (5),
   wherein said upper and lower funnel-shaped members (3, 4) each have axial openings (31, 41) at respective lower end portions (34, 44) opposite to said large diameter portions (30, 40).

2. Separator according to claim 1, wherein an annular passage (6) is defined by a radial outer surface (32) of said upper funnel-shaped member (3) and a radial inner surface (43) of said lower funnel-shaped member (4).

3. Separator according to claim 1, wherein said axial opening (41) of said lower funnel-shaped member (4) opens to an accommodation space (7) for accommodating solid matter separated from said fluid.

4. Separator according to claim 1, wherein said upper funnel-shaped member (3) opens with its large diameter portion (30) to an outlet section (8).

5. Separator according to claim 4, wherein said outlet section (8) is formed with an inner wall (80) which is continuous with an inner surface (33) of said upper funnel-shaped member (3).

6. Separator according to claim 4, wherein said outlet section (8) is formed with a circular cross section with a maximum diameter being lager than a diameter of said large diameter portion (30) of said upper funnel-shaped member (3).

7. Separator according to claim 1, wherein a passage is formed for allowing a flow of said fluid from said inlet opening (5) through said annular passage (6), into said axial opening (31) of said upper funnel-shaped member (3) and said large diameter portion (30) of said upper funnel-shaped member (3) in this sequence.

8. Separator according to claim 1, further comprising a separating shield (11) in a space between said upper and lower funnel-shaped members (3, 4), said separating shield (11) being formed as annular member which is attached to said inner wall (2) of said separator housing section (1) and preferably radially spaced to said outer surface (32) of said upper funnel-shaped member (3).

9. Separator according to claim 1, wherein a treatment section (50) is fluidly connected downstream of said upper funnel-shaped member (3) which is preferably provided with means for treating fluid flowing through said treatment section (50).

10. Separator according to claim 9, wherein an overflow section (53) is provided downstream of said treatment section (50) for leading fluid towards an outlet (12) of said separator.

11. Separator according to claim 10, wherein said overflow section (53) is adjustable for levelling edges of said overflow section with respect to a horizontal orientation by a levelling arrangement (54).

12. Separator according to claim 1, wherein each of said upper and lower funnel-shaped members (3, 4) is made by concrete based material.

13. Separator according to claim 1, wherein said treatment section (50) is provided in an outlet housing section (60).

14. Separator according to claim 13, wherein in a transition between said separator housing section (1) and said outlet housing section (60), an adapter element (61) is provided which has in inner surface which is continuous with said inner surface (33) of said upper funnel-shaped member (3) and an inner surface portion of said outlet housing section (60).

15. Separator according to claim 1, wherein a filter element (90) is provided in an area of said separator having the largest inner diameter and/or in an area providing the lowest average flow velocity in the separator.

* * * * *